Patented Feb. 9, 1932

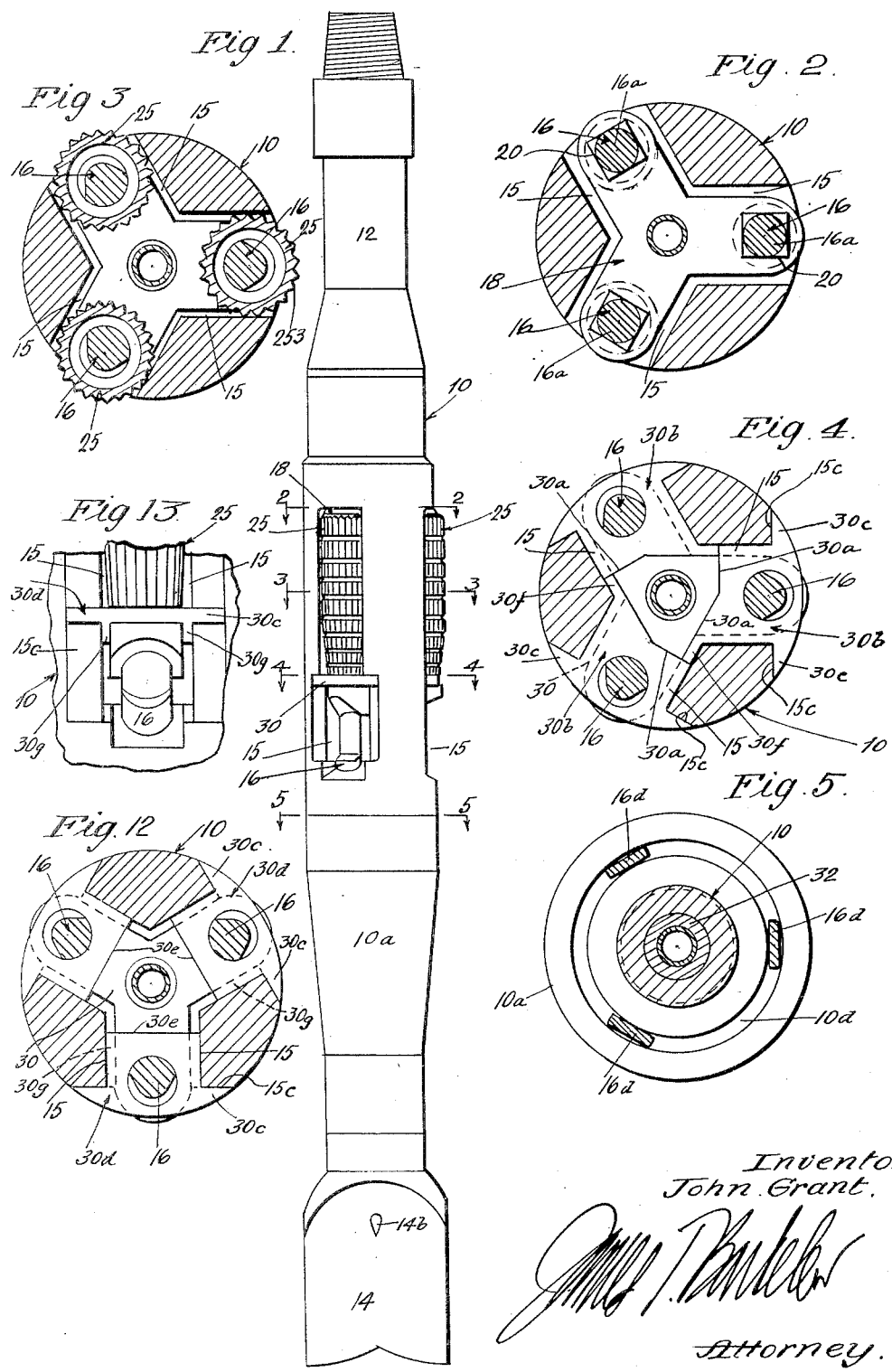

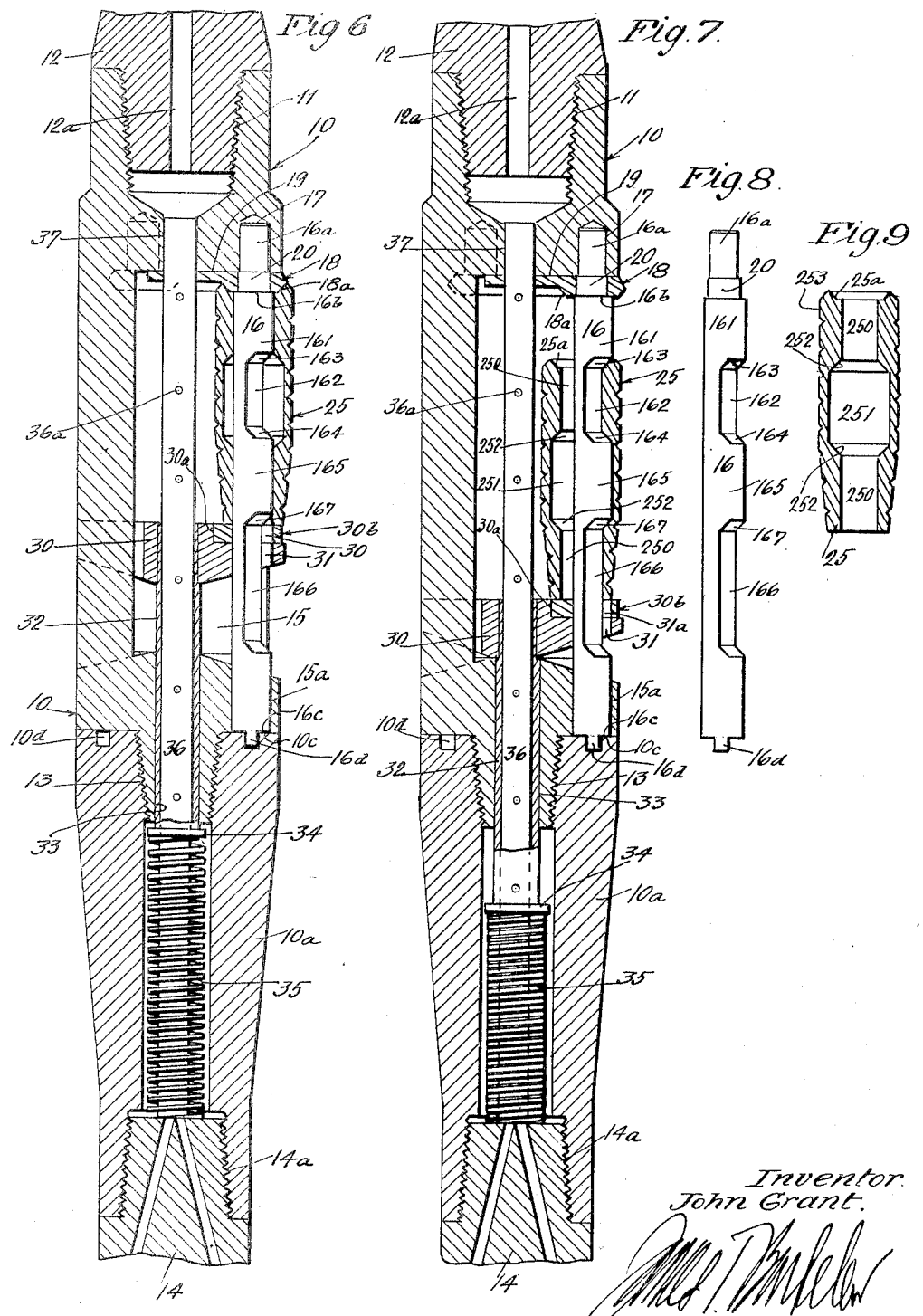
Feb. 9, 1932.  J. GRANT  1,844,354
EXPANDING WELL REAMER
Filed Oct. 10, 1927   3 Sheets-Sheet 2
Inventor
John Grant.
Attorney.

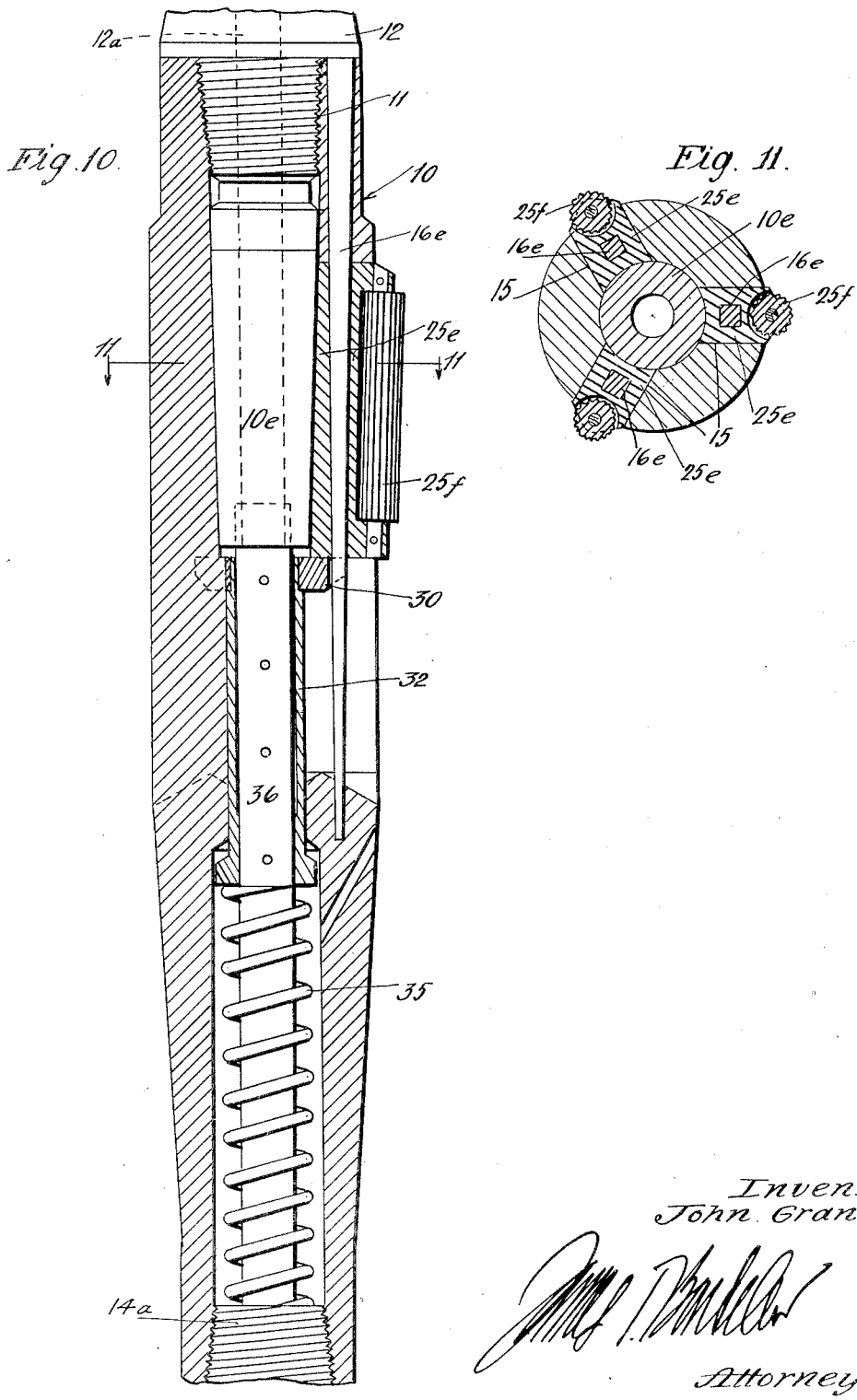

1,844,354

UNITED STATES PATENT OFFICE

JOHN GRANT, OF LOS ANGELES, CALIFORNIA

EXPANDING WELL REAMER

Application filed October 10, 1927. Serial No. 225,270.

This invention has relation to underreamers and, although not necessarily or limitedly, has more particular relation to rotary expanding reamers.

The general object of the invention is the provision of a simple, rugged and effective well reaming tool with maximum cutting edges; but further objects and corresponding characteristic accomplishments of the invention will be best understood from the detailed description of preferred illustrative embodiments.

In some of its features the present invention constitutes an improvement upon the expanding roller underreamer set out in application Serial No. 122,340, filed July 14, 1926. In said application an underreamer is described that embodies a single mandrel having offset or enlarged portions, the cutter or cutter carrier surrounding this mandrel and moving longitudinally on it so that in one longitudinal position it has a bearing or seat on the relatively enlarged or offset portion and in another longitudinal position surrounds the relatively smaller part of the mandrel, and so that in the last named position the cutter or cutter carrier can move inwardly for contraction.

In the specific form shown in said prior application, and the same is true of a specific form shown in this present application, the cutter or cutter carrier is illustrated in the form of a rotating roller, having relative longitudinal movement upon the mandrel and rotating on and surrounding the mandrel. In a broad aspect of the invention concerned in these applications, however, the element that is specifically described as a rolling cutter provided with cutting teeth may be regarded as a cutter carrier; and it may or may not rotate as a whole about the mandrel. In the features which are broadly common to both these applications, the generic claims are made in the prior application; while the claims of the present application are restricted to its own distinctive features and improvements.

A distinctive feature of the present invention, as compared with that of a said prior application, is the provision of several cutter carrying mandrels in a single body, the several mandrels and their respective cutters being arranged opposite each other around the central axis of the tool. Said prior application shows a plurality of cutters arranged, when in expanded position, around the central axis; but, all such cutters or cutter carriers surrounding the single mandrel body, the cutters or cutter carriers are, in that case, spaced from each other longitudinally along the mandrel body. In contradistinction, the present invention provides an underreamer body and provides what may be termed, for purposes of clear verbal distinction over the specific form of the prior invention, a plurality of mandrel pins arranged around the central axis and opposite each other, which mandrel pins are surrounded by the cutters or cutter carriers. However, such and other features of the invention, in its broader aspects, together with characteristic features of specific forms of the invention, will be best understood from the following detailed description, reference for this purpose being had to the accompanying drawings, in which—

Fig. 1 is a side elevation of an underreamer in accordance with my invention;

Figs. 2, 3, 4 and 5 are enlarged cross sections, respectively, on lines 2—2, 3—3, 4—4 and 5—5 of Fig. 1;

Fig. 6 is an enlarged longitudinal section of the underreamer of Fig. 1, showing the cutters expanded as they are in Fig. 1;

Fig. 7 is a similar section showing the cutter contracted;

Fig. 8 is a detailed elevation of a mandrel pin;

Fig. 9 is a detailed longitudinal section of a roller cutter;

Fig. 10 is a longitudinal central section showing a modified embodiment of the invention;

Fig. 11 is a cross-section on line 11—11 of Fig. 10;

Fig. 12 is a cross section similar to that of Fig. 4, showing a further modification; and Fig. 13 is a fragmentary side elevation of the structure shown in Fig. 12.

In the present illustrative embodiment shown in the drawings, there is an under-reamer body 10 provided at its upper end with the usual screw-threaded connection 11 to connect with a sub 12. The body may be conveniently made in two parts, having a body extension at 10a, screw-threaded as shown at 13, to the main body 10; the extension 10a having at its lower end the usual screw-threaded connection 14a to drilling bit 14 which drills ahead of the reaming cutters.

In the form here illustrated, any suitable or practical number of mandrel pins and cutters may be utilized; I have chosen to show three. The body 10 is therefore provided with three radial and longitudinally extending slots 15 which meet in center of the body as is best shown in the cross sectional views. Within each of these slots a longitudinal mandrel pin 16 is mounted. In Figs. 1 to 9 these mandrel pins are shown as having cylindric bearing surfaces and as being parallel to central axis of the tool; but in Fig. 10, as will be hereinafter described, the mandrel pins may be of a shape other than cylindric and need not be parallel with the axis. However, to go on with a description of the illustrative embodiment of Figs. 1 to 9, the mandrel pins 16 have cylindric reduced upper ends 16a which seat in cylindric sockets 17 that extend upwardly into the upper part of body 10 above the body slots 15. A thrust and holder plate 18, in the form of a three-armed spider (see Fig. 2), bears up against the downwardly facing shoulder or surface 19, formed by the upper ends of the slots 15; and the mandrel pins 16, where they pass through plate 15, have squares 20 fitting corresponding apertures through plate 18. Just below plate 18 mandrel pins have upwardly facing shoulders 16b which bear up against the under face of plate 18 to hold that plate up against the surface 19. It will be apparent from the foregoing description that plate 18 is one means of preventing the mandrel pins from rotating on their own axes, thus to keep the pins in proper position to cause the cutters to take their expansive movements in the proper directions. At the same time this plate 18 becomes an up thrust plate for the several cutters or cutter carriers; providing, in case the cutters or carriers rotate upon their mandrels, a rotary upthrust bearing for each cutter. In the specific design here illustrated, plate 18 has a downwardly facing conical bearing surface 18a around each mandrel pin 18, the corresponding conical bearing face 25a of the cutter or cutter carrier 25 being adapted to seat and to rotate upon bearing 18a, when in the uppermost position as shown in Fig. 6.

The lower ends of mandrel pins 16 extend below the lower ends of slots 15; and seat on and in the body extension 10a. The construction shown in the drawings provides a convenient form for assembly and disassembly. Bores 15a extend down from the lower ends of slots 15 to the lower end of body 10 to receive and hold the lower ends of the mandrel pins. The lower end shoulders 16c of the mandrel pins rest upon the upper end surface 10c of body extension 10a; and a mandrel extension 16d projects down into a recess 10d in the upper end surface of body extension 10a. In the form here shown these mandrel extensions 16d are preferably elongated in cross section, as shown in Fig. 5, and they extend into and lie lengthwise in a recess 10d that is in the form of a narrow circular groove; so that the interengagement of these parts aids in preventing the several mandrels from rotating on their own axes.

Riding vertically within the body slots 15 is a cutter propeller 30 in the form of a three-armed spider, each arm having a vertical opening 31 to take a mandrel pin 16. This cutter propeller is removably mounted upon the upper end of a propeller tube 32, which is capable of vertical sliding motion through the bore 33 in the lower part of the body 10. The lower end of propeller tube 32 is provided with a head 34 which forms an upper seat for the compression spring 35, the lower end of the spring resting upon the pin 14a of drilling bit 14 and the spring surrounding a water circulation pipe 36 which extends longitudinally throughout the whole length of body 10 and extension 10a. In this particular form of tool the sub 12 has a longitudinal water circulation passage 12a which delivers water to the upper end of pipe 36. Pipe 36 extends its upper end into a bore 37 of body 10, and the pipe extends downward through the central slotted part of the body, plate 18 being bored to pass the pipe, and extends on down through propeller tube 32, then through the spring 35, and rests at its lower end upon bit pin 14a. The pipe thus delivers fluid from the drilling string to the circulation passages 14b of the bit; and through perforations 36a in its wall it delivers fluid inside the set of cutters and mandrels to wash and keep them clean.

The form of mandrel pins 16 and of cutter elements 25, for expansion and contraction of the cutters, is in substance the same as that of the mandrel cutters in said prior application. Each mandrel has an upper cylindric part 161, concentric with the axis of the mandrel pin. Immediately below cylindric part 161 there is a recessed portion 162 having at its upper and lower ends diagonal surfaces 163 and 164. Below the recessed portion 162 there is another axial cylindric portion 165; then below portion 165 is another recessed portion 166 which has a diagonal surface 167 at its upper end. The mandrel recesses are sunk from the outer sides of the mandrels inwardly toward the central axis of the body, so that when the cutter elements move into these recesses they move contractively in toward the body center. The cutter elements, in this specific instance, each involve but one cutter part; that is, a roller cutter 25 having a longitudinal bore through it and mounted directly on the mandrel. Near the ends of the rollers the bore 250 is of proper size to seat snugly and, in this particular case, to have rotary bearing, upon the cylindric mandrel parts 161 and 165 when the roller is in its upper expanded position. Between these two spaced smaller bore portions 250 is an enlarged bore portion 251 having at its ends diagonal or conical surfaces 252. The interaction of the several mandrel and roller surfaces will be apparent from the consideration of Figs. 6 and 7 and Figs. 8 and 9. In the lower contracted position of the cutters, they may move inwardly, due to the fact that the enlarged bore portion 251 of each roller then registers with cylindric mandrel portion 165, while smaller bore portions 250 of the roller register with mandrel recessed portions 162 and 166. While passing through a casing the rollers are held inwardly and are consequently prevented from moving upwardly under the pressure of spring 35. Immediately the rollers pass out of the lower end of the casing, the spring, urging the propeller 30 upwardly, urges the rollers upwardly. The conical surfaces 25a and 252 of the rollers, co-acting respectively with the diagonal surfaces 163 and 167 of the mandrel pins, then move the rollers outwardly as they move up. The rollers thus move upwardly and outwardly into alignment with the mandrel cylindric portions 161 and 165, and then move up on those cylindric portions, finally reaching the positions shown in Fig. 6, where their upper conical end-thrust surfaces 25a bear against the corresponding in-thrust bearing surfaces 18a of plate 18, and their two smaller bore portions 250 have complete bearings upon mandrel portions 161 and 165. In the specific design now being described, the members 25 constitute the cutters themselves; that is, they constitute both the carriers and the ultimate cutting element. But the body of the roller may be looked at as a cutter carrier, while its teeth 253 may be considered the cutters proper.

During reaming operations the cutters and carriers and their mandrel pins are subjected to inward radial thrusts toward the central axis of the reamer, also to upward longitudinal thrusts and also to lateral thrusts in a direction circumferentially of the reamer body. The upward longitudinal thrusts are taken care of by upper end thrust bearings as before explained. The lateral and the inward radial thrusts are taken care of at the upper ends of the mandrel pins by the solid mountings of these upper ends in the body and also in the plate 18. At the lower ends of the mandrel pins the radial and lateral thrusts are, at least in part, taken care of by the mountings of the mandrel pins in the body. However, when the cutters are in their upper operating positions their lower ends are at some little distance above the lower body-mounted ends of the mandrel pins; and it is desirable to provide means to take the in-thrust and the lateral thrust directly at the lower ends of the rollers, so that the rollers and mandrel pins will then be directly supported against all thrusts without putting bending strains on the mandrels. Such provision is here made in the cutter propeller 30. Each propeller arm is recessed on its upper face, providing an end thrust shoulder 30a. A thrust block 30b of the form best shown in Fig. 4, is seated upon each propeller arm, each thrust block passing the corresponding mandrel pin, by having a bore 31a which is a continuation of the propeller arm bore 31. Thrust block 30b, as shown in Fig. 4, is of a width to fill the body slot 15 from side to side; the thrust block bore 31a being of the same size as the cylindric parts of the mandrel pins, the block therefore transmits all the lateral thrusts from the mandrel pin, directly under the roller, to the body of the tool. The thrust block is also shaped so as to rest back against the propeller shoulder 30a, and furthermore it has overhanging lugs 30c at its outer end which ride the body surfaces 15c at opposite sides of the body slots 15. The blocks thus transmit radial inthrust to the propeller, thus tending to equalize the opposed radial in thrusts; and they also transmit radial thrusts directly to the body. The thrust block construction, as here described, may be regarded as a part of the cutter propeller. The thrust blocks are here described as separate pieces, only because, in the specific structure here set out, the propeller arms must be narrower in width than the slots 15 in order to make the spider-shaped propeller removable from the body.

Figs. 10 and 11 illustrate a typical modification of the invention; here it will be seen that the cutter carrier has its expansive movement by reason of the fact that the upper end of the mandrel pin is larger than the lower end, so that the cutter carrier fits the upper end of the mandrel pin comparatively tightly, but is loose when it is on the lower end of the mandrel pin. These facts, and the fact that the mandrel pin, in effect, tilts outwardly at its upper end, causes the positive outwardly movement of the cutter carrier as it moves upwardly. And these same general considerations apply broadly to the specific forms hereinbefore described.

The specific structure shown in Figs. 10 and 11 is, in its general design, similar to that before described. Here, however, the mandrels 16e are square and are tapered from end to end. The movable cutter element is made up of two parts, as specifically shown here; a cutter carrier 25e and a cutter proper 25f; the several carriers 25e move vertically on each of the mandrels, cutter carriers surrounding the mandrels as shown in Fig. 11, and fitting the mandrels snugly when the carriers are in their uppermost positions, as shown in Fig. 10. Due to the fact that these cutter carriers do not, in this specific form, rotate upon the mandrels, they may fit the body slots 15 from side to side to transfer lateral thrust to the body; and also the body may be extended down between the carriers, in the form of a core 10e, against which the rear faces of the carriers may back up to transfer radial thrust. With those arrangements for taking the lateral and radial thrust, the propeller 30 need not be provided with thrust blocks 30b as in the form before described.

The cutters proper of Figs. 10 and 11 may be of any desired form. For instance they are illustrated as rollers 25f mounted on the carriers 25e.

Referring again to the thrust blocks, of which one form has been previously described, I now refer to Figs. 12 and 13 in which another form is shown. Here a thrust block 30d bears back against a shoulder 30e on the arm of the propeller this shoulder extending transversely right across the arm. Thrust block 30b of Fig. 4 bears back against the thrust shoulder 30a of angular formation as shown in Fig. 4, these thrust blocks 30b having lugs 30f which extending laterally into the body slot 15, adjacent to the slot in which the block lies, keep the blocks from moving outwardly. In the form of Figs. 12 and 13, thrust block 30d is prevented from moving outwardly merely by the fact that mandrel pin 16 passes through it, as is also the case in the thrust block of Fig. 4. In Figs. 12 and 13 the thrust block also has outside overhanging lugs 30c that ride the body surfaces 15a at opposite sides of slots 15. Thrust blocks 30d also have dependent side flanges 30g which depend at opposite sides of the arms of propeller 30, to fill the spaces between the sides of the arms and the side surfaces of the slots, and to afford a wide face for the blocks on the side surfaces of the body slots.

I claim:

1. In an expansive well reamer, a body, a plurality of longitudinally extending mandrels in the body offset from and spaced around the central longitudinal axis of the body, and cutter elements mounted one on and surrounding each of the mandrels and movable laterally relative thereto, and means for moving said elements laterally.

2. In an expansive well reamer, a body, a plurality of longitudinally extending mandrels in the body offset from and spaced around the central longitudinal axis of the body, and cutter elements mounted one on and surrounding each of the mandrels and movable longitudinally and laterally relatively thereto, and means for causing relative lateral movements of said elements by virtue of their relative longitudinal movements.

3. In an expansive well reamer, a body, a plurality of longitudinally vertically extending mandrels in the body offset from and spaced around the central longitudinal axis of the body, the mandrels having upper bearing surfaces relatively further from and lower bearing surfaces relatively closer to the body axis, and cutter elements mounted one on and surrounding each of the mandrels and movable vertically thereon to bear on either of the mandrel bearing surfaces.

4. In an expansive well reamer, a body, a plurality of longitudinally vertically extending mandrels in the body offset from and spaced around the central longitudinal axis of the body, the mandrels being larger at their upper than at their lower ends, and cutter elements mounted one on and surrounding each of the mandrels and movable vertically thereon, said elements fitting the upper parts of the mandrels relatively tightly and the lower parts relatively loosely.

5. In an expansive well reamer, a body, a plurality of longitudinally extending mandrels in the body offset from and spaced around the central longitudinal axis of the body, cutter elements mounted one on and surrounding each of the mandrels and movable longitudinally thereon, and means acting between each mandrel and its cutter element to move the element laterally by virtue of relative longitudinal movement.

6. In an expansive well reamer, a body, a plurality of longitudinally extending mandrels in the body offset from and spaced around the central longitudinal axis of the body, cutter elements mounted one on and surrounding each of the mandrels and movable longitudinally thereon, and means acting between each mandrel and its cutter element to move the element laterally by virtue of relative longitudinal movement, and means to move the elements longitudinally embodying a longitudinally movable propeller having parts surrounding each mandrel and bearing against the ends of the elements.

7. In an expansive well reamer, a body with vertical longitudinal slots, a plurality of vertical mandrels mounted in the body slots, cutter elements mounted on and surrounding the mandrels and movable vertically thereon, and a spring actuated propeller playing vertically in the body slots below the elements and having parts surrounding the mandrels and bearing against the body at opposite sides of the body slots to transfer thrust from the mandrels to the body.

8. In an expansive well reamer, a body with vertical longitudinal slots, a plurality of vertical mandrels mounted in the body slots, cutter elements mounted on and surrounding the mandrels and movable vertically thereon, and a spring actuated propeller playing vertically in the body slots below the elements and having parts surrounding the mandrels and bearing against the opposite slot walls to transfer lateral thrust from the mandrels to the body and bearing inwardly against the body along the edges of the slots to transfer radial thrust from the mandrels to the body.

9. In an expansive well reamer, a body, a plurality of longitudinally extending mandrels in the body offset from and spaced around the central longitudinal axis of the body, and rotative roller cutters revolubly mounted on and surrounding the mandrels and longitudinally movable thereon.

10. In an expansive well reamer, a body, a plurality of longitudinally extending mandrels in the body offset from and spaced around the central longitudinal axis of the body, and rotative roller cutters revolubly mounted on and surrounding the mandrels and longitudinally movable thereon, and means for causing relative lateral movements of the roller cutters by virtue of their longitudinal movements relative to the mandrel.

11. In an expansive well reamer, a body, a plurality of longitudinally extending mandrels in the body offset from and spaced around the central longitudinal axis of the body, and rotative roller cutters revolubly mounted on and surrounding the mandrels and longitudinally movable thereon, means for causing relative lateral movements of the roller cutters by virtue of their longitudinal movements relative to the mandrels and a cutter propeller having parts bearing longitudinally on the ends of the roller cutters and surrounding the mandrels and bearing against the body to transmit thrusts from the mandrels to the body near the ends of the roller cutters.

12. In an expansive well reamer, a body comprising a main body portion and a longitudinal extension joined to and transversely shouldered against the upper end of the main body, the main body being slotted with longitudinal radial slots from its lower end upwardly to a point near its upper end, mandrel seat sockets extending up into the main body above the upper ends of the slots and down into the body below the lower ends of the slots, longitudinal mandrels seated at their upper and lower ends in the said seat sockets, the lower ends of the mandrels shouldering on the upper end of the body extension, and cutter elements mounted on the mandrels.

13. In an expansive well reamer, a body comprising a main body portion and a longitudinal extension joined to and transversely shouldered against the lower end of the main body, the main body being slotted with longitudinal radial slots from its lower end upwardly to a point near its upper end, mandrel seat sockets extending up into the main body above the upper ends of the slots and down into the body below the lower ends of the slots, longitudinal mandrels seated at their upper and lower ends in the said seat sockets, the lower ends of the mandrels shouldering on the upper end of the body extension, cutter elements mounted on the mandrels, a propeller spider with apertured arms surrounding the mandrels and movable longitudinally on them the spring means moving the propeller spider to move the cutter elements.

14. In an expansive well reamer, a body comprising a main body portion and a longitudinal extension joined to and transversely shouldered against the lower end of the main body, the main body being slotted with longitudinal radial slots from its lower end upwardly to a point near its upper end, mandrel seat sockets extending up into the main body above the upper ends of the slots and down into the body below the lower ends of the slots, longitudinal mandrels seated at their upper and lower ends in the said seat sockets, the lower ends of the mandrels shouldering on the upper end of the body extension, cutter elements mounted on the mandrels, a propeller spider with apertured arms surrounding the mandrels and movable longitudinally on them, a propeller tube removably carrying the spider and extending into the body extension, and a spring in the body extension acting on the tube.

15. In an expansive well reamer, a body comprising a main body portion and a longitudinal extension joined to and transversely shouldered against the lower end of the main body, the main body being slotted with longitudinal radial slots from its lower end upwardly to a point near its upper end, mandrel seat sockets extending up into the main body above the upper ends of the slots and down into the body below the lower ends of the slots, longitudinal mandrels seated at their upper and lower ends in the said seat sockets, the lower ends of the mandrels shouldering on the upper end of the body extension, cutter elements mounted on the mandrels, a propeller spider with apertured arms surrounding the mandrels and movable longitudinally on them, and spring means moving the propeller spider to move the cutter carrier, the propeller spider arms having parts slidably engaging the body opposite sides of the slots to transmit thrusts from the mandrel to the body.

16. In a well reamer, a longitudinally slotted body, a longitudinal mandrel in the body slot, a cutter element bearing on the mandrel, and element moving means embodying a propeller bearing on the mandrel and movable lengthwise thereof to move the element, the propeller fitting the body slot loosely, and a thrust block associated with the propeller, bearing on the mandrel directly at the end of the element, and having extending parts that overhang the propeller and bear against the slot walls to transmit thrusts from the element to the slot walls.

17. In a well reamer, a longitudinally slotted body, a longitudinal mandrel in the body slot, a cutter element bearing on the mandrel, and element moving means embodying a propeller bearing on the mandrel and movable lengthwise thereof to move the element, the propeller fitting the body slot loosely, and a thrust block associated with the propeller, bearing on the mandrel directly at the end of the element, and having extending parts that overhang the propeller and bear against the slot walls to transmit thrusts from the element to the slot walls, and the thrust block also having overhanging lugs at its outer end outside the body to ride on the body along the edges of the slot and transmit radial thrust to the body.

18. In a tool of the character described, a body with a longitudinal slot, a longitudinal mandrel pin in the slot, and a cutter element surrounding the mandrel pin and movable transversely with relation thereto.

19. In a tool of the character described, a body with a longitudinal slot, a longitudinal mandrel pin in the slot, a cutter element surrounding the mandrel pin and movable transversely and longitudinally with relation thereto, and means to cause transverse movement of said cutter element by virtue of its longitudinal movement.

20. In an expansive well reamer, a body, a plurality of longitudinally extending cutter carrying pins in the body offset from and spaced around the central longitudinal axis of the body, cutter elements mounted one on each pin and movable longitudinally of the body, and a longitudinally movable cutter propeller mounted on the body and having parts engaging the cutter carrying pins to support them laterally and bearing laterally against the body to transfer thrusts from the cutter carrying pin to the body.

In witness that I claim the foregoing I have hereunto subscribed my name this 3rd day of October, 1927.

JOHN GRANT.

CERTIFICATE OF CORRECTION.

Patent No. 1,844,354.  Granted February 9, 1932, to

JOHN GRANT.

It is hereby certified that error appears in the printed specification of the above numbered patent requiring correction as follows: Page 5, line 80, claim 13, strike out the word "the" and insert a comma and the word and; and that the said Letters Patent should be read with this correction therein that the same may conform to the record of the case in the Patent Office.

Signed and sealed this 5th day of April, A. D. 1932.

(Seal)

M. J. Moore,
Acting Commissioner of Patents.